Sept. 2, 1952     W. W. GASKELL, JR     2,608,927
RAPID PERCOLATOR
Filed Jan. 27, 1949
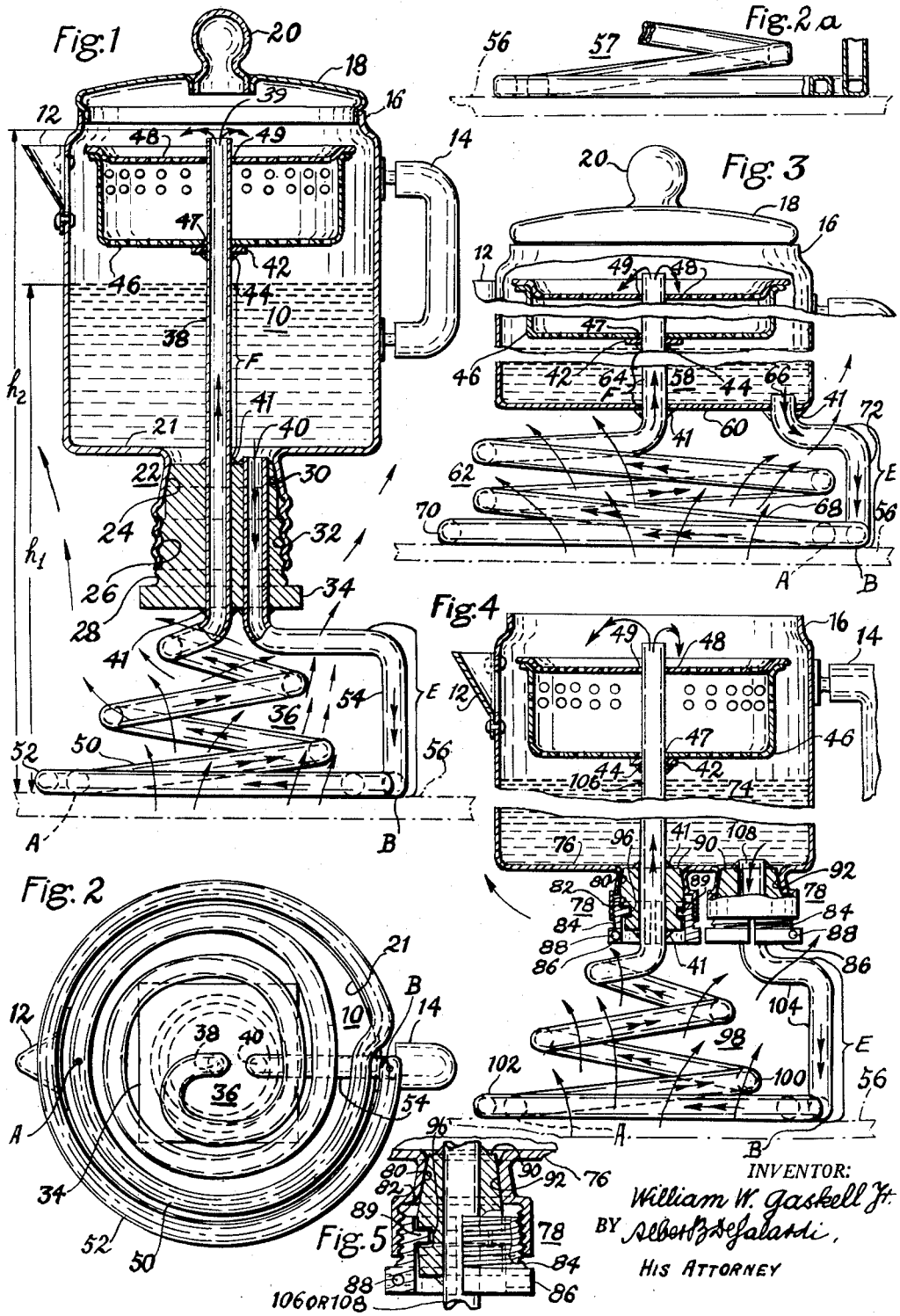
INVENTOR:
William W. Gaskell Jr.
BY Albert B. de Galassi
HIS ATTORNEY Patented Sept. 2, 1952

2,608,927

UNITED STATES PATENT OFFICE 2,608,927

RAPID PERCOLATOR

William W. Gaskell, Jr., Penn Township, Allegheny County, Pa.

Application January 27, 1949, Serial No. 73,101

4 Claims. (Cl. 99—310)

This invention pertains to percolators or devices producing by infusion aqueous solutions of plant substances such as of the active ingredients of coffee seeds, medicinal herbs, and the like.

In coffee making the object of the process is to extract the aromatic volatile oils and other valuable ingredients contained in the coffee beans and to retain them in the finished beverage. For this end it is important that only that small fractional part of the water should be heated close to boiling temperature which actually runs through the coffee beans and that the main portion of the water should have a temperature well below the boiling point so that the aromatic oils carried by the percolating portion of the water into the main body thereof should not volatilize and escape into the atmosphere. The preparation of other infusions have similar objects, so that when I describe coffee making and/or the operation of the invented device, the specific words should be understood to have also a collective meaning. Thus "water" should mean also any kind of liquid used as extracting medium, "coffee beans" should stand also for any kind of matter to be infused, and "steam" for any vapor liberated from the heated liquid.

Up to date coffee making percolators heat substantially the whole body of the water up to the boiling point, they develop a considerable amount of steam, which, with the volatilized aromatic oils, escape into the atmosphere, robbing the finally obtained beverage of fragrance, strength and quality. It is a common experience that when coffee is made in any kind of conventional percolator the whole apartment or house is filled with pleasant aroma. Naturally whatever portion of the aromatic oils pass into the atmosphere is lost for the beverage produced, the latter becoming weaker, less palatable and effective.

Another drawback of conventional percolators is that, substantially their whole water content being heated, it takes a considerable time until percolating starts and the process of infusion begins, and, until the beverage is finished the room is filled with steam.

My invention obviates these and other drawbacks by providing a percolator that heats to, or above, boiling temperature only that relatively small portion of its water content that is used to make the infusion and only for a relatively short time period immediately before its actual use. Furthermore my invention condenses the produced small amount of steam so that the remaining is negligible; it also causes a rapid start of percolation in a very short time period and makes use of a heating coil acting also as a supporting base for the utensil, which coil absorbs a great portion of the heat to which the device is exposed. To this dual purpose structural element of my invention hereinafter I refer as "heating coil," "coil," "tubular base," or "base," all these expressions designating the same element.

Hence one object of my invention is to provide a percolator that employs a coil for heating its water content which coil protrudes downwardly from the device and supports it as a base.

Another object is to provide a percolator that is supported by a heating coil having an inlet portion, an outlet portion and protruding from the bottom of the container, the lowermost or largest convolution with the adjoining inlet portion of which lay outside the area of the orthogonal projection of the percolator bottom upon the plane of the base or support surface providing thereby a more stable support for the percolator than the bottom itself would offer and locating said portions of the coil away from the path of the heating gases.

Another object is to provide a device of the character described which employs a heating coil protruding freely from the bottom of its container and is exposed on the greater portion of its outer surface to contact with heating gases streaming with a relatively high velocity and, at its inlet- and outlet portions to the cooling effect of the atmosphere and to that of the liquid in the container, respectively.

Another object is to provide a percolator employing a liquid container having a coil protruding from its bottom, the riser of the inlet portion and the bottom convolution of largest diameter of which coil are laying outside the path of the heating gases whereby these parts are cooled by the atmosphere and the liquid flow in the coil is directed from the inlet portion toward the outlet portion, when heated.

A further object is to provide a device of the type set forth which has a heating coil protruding downwardly from its bottom portion and is provided with means to sealingly attach the heating coil to the water container portion of the percolator.

Another object is to provide a percolator having a water container portion, a heating coil portion and releasable means for sealingly attaching the container and coil portions together.

The achievement of these and other objects will be evident to those skilled in the art when perusing the following specification and accompanying drawing in which:

Fig. 1 is the side elevational view, chiefly in section, of the first preferred embodiment of the invented percolator in which the heating coil is rigidly attached to a conically ending threaded plug which is sealingly screwed into a corresponding downwardly extending portion of the water container part of the percolator.

Fig. 2 is the bottom view of the first preferred embodiment as illustrated by Fig. 1;

Fig. 2ᵃ is a partial side elevational and sectional view of the bottom region of the heating coil alone made of tubing having substantially square cross section throughout.

Fig. 3 is a side elevational view of the second preferred embodiment of my invention the water container part being shown chiefly in section and broken away, the coil being shown in elevational view; both end portions of the heating coil being rigidly and permanently sealingly fixed to the bottom portion of the water container;

Fig. 4 is the side elevational view, chiefly in section, of the third preferred embodiment of the invented percolator of which the outer cap and dome being omitted since they are identical to the corresponding parts of the previous embodiments; the two end portions of the heating coil are rigidly and sealingly fixed each to one conical plug provided with an annular groove which is engaged by a split annular threaded bushing having an inwardly extending collar, both plug and bushing coacting with conical and threaded, suitably dimensioned downward extensions of the bottom plate of the water container, thus providing a releasable and sealing attachment between coil and container;

Fig. 5 is a partial sectional view to a somewhat enlarged scale of the third preferred embodiment showing one of the downwardly protruding bottom extensions with a cooperating conical and grooved plug and split, threaded bushing.

Identical parts are designated by the same numerals of reference throughout the several figures of the drawing.

In the following I refer to my invention as a rapid coffee percolator according to its main use but it will be understood that the device may be used to make infusions of other plant substances such as medicinal herbs and the like.

Referring closer to the figures by the numerals of reference in Figs. 1 and 2 the numeral 10 designates generally the water container of the invented percolator having rigidly fixed thereto spout 12 and handle 14 on the opposite side. Container 10 has a top cover seating portion 16 which free-slidingly accommodates outer cover 18 carrying a centrally located, transparent dome 20 rigidly fixed thereto.

The bottom plate 21 of container 10 has a centrally located, preferably integral and downwardly protruding tubular extension generally designated by 22 which has a downwardly widening internal conical portion 24 continued by a cylindrical internal threaded portion 26, the minor diameter of the threads being larger than the maximum diameter of conical portion 24.

Extension 22 accommodates plug 28 having conical end portion 30, a cylindrical threaded portion 32 and a head 34 which is suitably shaped to be engaged by the fingers or by a tool for turning. Head 34 is shown to be square (see Fig. 2) but it is obvious that it may have other polygonal or even cylindrical shape with a roughened or knurled surface for increased friction at turning. The threaded and the conical portions of plug 28 fit the corresponding portions of extension 22 so that threading plug 28 suitably into extension 22 the conical portion will seal and the connection between container 10 and plug 28 becomes watertight. The taper angles of the conical portions 24 and 30 are equal and selected to be such to develop sufficient friction for locking the plug to the extension sealingly against loosening by vibration.

Plug 28 sealingly carries a heating coil generally designated by 36 having outlet or discharge portion 38 terminating in discharge opening 39, an intake or inlet extension 54 beginning with intake opening 40, and a plurality of convolutions between these portions. As best seen in Fig. 2 the lowermost convolution 52 adjoins inlet portion 54 and together with it lays outside the orthogonal projection of container bottom 21.

Discharge end portion 38 is centrally located in plug 28 and also in container 10 and its open end rises into the top portion thereof. Both end portions 38 and 54 are permanently and watertight fixed to plug 28 by means 41 indicating suitable attachment means such as a continuous, sealing layer of metal deposited by welding, brazing or soldering.

Washer 42 is welded, brazed, soldered or otherwise rigidly fixed at 44 to discharge endpiece 38 and supports a perforated vessel 46 having central aperture 47 fitting over discharge endpiece 38 which vessel is to receive roasted and ground coffee seeds in sufficient quantity for the finished beverage. A perforated inner cover 48 with a central hole 49 fits the top of vessel 46.

The delivery or discharge end portion 38 rises, through hole 49, somewhat above the inner cover 48. The convolutions of coil 36 are shown to form a downwardly expanding conical spiral the purpose of which is to absorb as much heat as is practicable by intercepting radiation and by exposure to the heating medium.

Coil 36 is so fashioned that convolution 50, the one before the bottom convolution 52, reaches at point A a plane 56 which is tangential also to bottom convolution 52. From point A to point B, which is at the center of the riser part of intake portion 54, coil 36 contacts plane 56 for $180°+360°=540°$ angle or 1½ convolutions marked by a dot and dash spiral line substantially encircling an area that is larger than the orthogonal projection of bottom plate 21 on plane 56. Plane 56 is represented by the top of the supporting part of the used heating device (like the grates of a fuel burning range or the heating elements of an electric range) shown in dot and dash lines. This plane is horizontal and coincides with that one that marks the lower outer level of bottom convolution 52 when operated.

The area in plane 56 substantially encircled by contact line A—B and serving as support area for the percolator being larger than the projection of bottom plate 21 on plane 56 it is evident that coil 36 offers a more stable support for the percolator disclosed than a flat bottom of the water container would which is used to support conventional percolators. The selection of point A on coil 50 is a matter of choice so that the arc of contact A—B may come close to two full convolutions or even three convolutions if the point A is chosen to lay on the next higher coil of smaller diameter. The material from which the parts are made preferably (except handle 14 covered by a heat insulator) is heat resisting, rustproof metal or glass.

Coil 36 is a continuous metal tubing having a single wall and being without any heat-insulated portions so that the riser part of its intake extension 54 and its bottom convolution of largest diameter 52, are effectively cooled by the atmosphere and its outlet extension 38 by the surrounding liquid in container 10 for which purposes the locations and dimensions of the respective parts are properly chosen. Coil 36, being continuous, is necessarily integral and is devoid of any extensions by separate parts such as tubes, nozzles and valves avoiding leakage and turbulence to the flow of liquid therein.

The areas of the inlet and outlet extensions marked by brackets E and F are cooled while the convolutions 50 and those upward from it are heated by the hot gases continuously streaming as indicated by the single headed arrows. The double headed arrows mark the direction of the flow of the liquid inside the coil.

The mode of operation of the described embodiment of my invention is as follows:

The necessary quantity of water and coffee having been filled into container 10 and vessel 46, respectively, inner cover 48 and outer cover 16 are put into their proper locations and the percolator is placed upon the heating device so that the top surface 56 of its coacting part contacts and supports bottom convolution 52 and with it the whole percolator. Then the heating device is started (by igniting fuel or closing electric current).

Before heating starts, by the law of communicating vessels, the water in the outlet extension 38 is at the same level as that in container 10. Coil 36, when heated, transmits the heat quickly to the water therein which rises to boiling temperature decreasing its specific gravity while the water in the container 10 is but little heated and that in convolution 52 and the adjoining intake extension 54 (see bracketed region E) is cooled by the atmosphere. The liquid surrounded part in container 10 of outlet extension 38 (see bracket F) is cooled by the liquid, reducing the steam escaping at opening 39 to a negligible quantity and with it reducing the loss of the volatile oil, extracted from the infused matter and continuously repercolated through coil 36, to an insignificant fraction. As a consequence of aforegoing procedure the water column in the outlet extension 38 becomes lighter than that surrounding it and than that contained in intake extension 54 and will rise and be discharged upon inner cover 48 through the perforations of which it reaches the coffee seeds in vessel 46 at substantially boiling temperature extracting the essential ingredients from the seeds. At this point the discharged water is somewhat cooled, below boiling temperature, flows through the perforations of the vessel 46 into container 10 carrying with it the extracted essential oils and other ingredients thereinto. Simultaneously the intake extension 54 of coil 36 containing the less heated water having greater specific gravity, will admit a constant stream of water sinking from container 10 through intake portion 54 into bottom convolution 52 and therethrough into 50 and being rapidly heated there it rises therefrom through the other convolutions and outlet portion 38 through discharge opening 39 over the inner cover 48 to repeat the infusion until the final beverage with proper strength and fragrance is obtained, when the heat is stopped. It will be appreciated that the relatively small portion of the water content in coil 36 is rapidly heated and used for making the infusion while the overwhelmingly greater part is but little heated keeping it well below the boiling point of the water and that of the extracted volatile aromatic oils so that they are practically entirely retained by the solvent. It is also evident that through this partial and quick heating followed by condensation and cooling the steam production is practically eliminated. According to the requirements of equilibrium in the legs of communicating vessels it is also certain that the flow of the liquid in coil 36 will always follow the suction effect of the ascending lighter steam-liquid mixture in the outlet extension 38, hence, the direction of the flow will be always from the inlet portion 54 toward the outlet extension 38 and its opening 39 so that no reverse flow will develop in normal operation and no means for preventing it (such as a check valve) will be needed in the combination.

The time elapsing from the start of the heating until boiling water is discharged over cover 48 depends, aside of the applied heat, upon the dimensions and physical characteristics, such as surface area, heat conductivity and wall thickness of heating coil 36 so that for percolators of various capacities suitable coils can be constructed to obtain a predetermined time interval in which percolation will start. This dimensioning of the coil, being a routine matter well within the knowledge of a skilled mechanic, I need not elaborate thereupon.

It is to be noted that ample space is provided between the convolutions of coil 36 for passage of the heating medium without undue obstruction or deflection, so that quick and efficient heating causing rapid percolation is provided with negligibly small quantity of escaping from container 10 into the atmosphere, as hereinbefore explained. While heating coil 36 is suitably dimensioned and shaped to absorb most of the heat supplied at the same time it shields the riser part of its intake extension 54 and the bottom plate 21 from being effectively heated keeping the main body of the water in container 10 well below the boiling point during the process of infusion.

Coil 36, as best seen in Fig. 2, is shown to turn counterclockwise starting with the top convolution but it is obvious that the convolutions may be turned clockwise if desired. To disengage coil 36 from water container 10 for cleaning, repair or exchange purposes, plug 28 is simply unscrewed carrying with it coil 36.

The unidirectional flow in coil 36 and the rapid percolation can be proven by calculation. Equilibrium in a communicating vessel requires that $$s_1 h_1 = s_2 h_2 \qquad (a)$$

where $s_1$ is the average density of the liquid column on the inlet side and $h_1$ is its height, and $s_2$ is the average density of the liquid and vapor mixture in the outlet side and $h_2$ is the height of this column. The temperature of the inlet column $t_1$ is lower than that of the outlet column which is $t_2$. The liquid being water or other solvent, as a general rule the density decreases with the increase of the temperature, hence, $s_1$ is greater than $s_2$ and $s_1/s_2$ is greater than 1. From Equation $a$ $$h_2 = s_1 h_1 / s_2 \qquad (b)$$

hence $h_2$ is always greater than $h_1$ requiring that liquid should flow always from the air cooled intake extension 54 toward outlet extension 38.

In the invented device, which cools both inlet and outlet extensions, it is reasonable to assume that the average temperature in the inlet column remains substantially at room temperature (70° F.) and that of the outlet column reaches, after a short heating, 212° F. or the boiling temperature of water which will be substantially maintained by the cooling effect at the bracketed F region of outlet portion 38.

According to tables contained in engineering handbooks the density of water at 70° F. is 62.31 lbs./ft.³ and at 212° F. 59.76 lbs./ft.³ (Kent's Engineering Handbook, pp. 742); the density of saturated steam (see Marks' Handbook, sec. edit., 1924, p. 332) at 212° F. and atmospheric pressure is .03732 lb./ft.³.

To give a specific numerical example the dimensions of the device as shown in Fig. 1 are taken. Here $h_1$ measures 4.5″ or .375 ft., $h_2$ measures 5.8″ or .4844 ft.

Substituting in Equation $a$ the numerical values, the necessary density of the water-steam mixture of the outlet side column averages $$s_m = \frac{62.31 \times .375}{.4844} = 48.24 \text{ lbs/ft.}^3$$

which is the requirement to start and maintain percolation through outlet opening 39. This mixture corresponds to $y$ parts of 212° water and 1 part of 212° saturated steam at atmospheric pressure. Using the respective component densities, the resulting average density of the mixture is $$s_m = 48.24 = \frac{59.76y + 0.03732}{y+1}$$

or $$48.24y + 48.24 = 59.76y + 0.03732$$

Solving for $y$ $$(59.76 - 48.24)y = 48.24 - 0.03732$$

and $$11.52y = 48.2$$

from which $$y = \frac{48.2}{11.52} = 4.35$$

In words, the proportion of the quantities of water and steam in the exemplary device on the outlet side in coil 36 is 4.35 to 1 meaning that the quantity of steam required to start and maintain percolation is 23 percent of that of the water in that column which may be generated on the average gas flame of an ordinary kitchen stove in a fraction of a minute.

Fig. 2ª shows a modified form of a heating coil 57 made of tubing with substantially square cross section. By using tubing having a cross section with one or more straight sides the advantage of a relatively larger surface and greater basing area may be obtained. Coil 57 as shown is in other respects the same as coil 36 in Figs. 1 and 2, hence what was said relative to its convolutions, structure, inlet and outlet extension, cooling and operation of coil 36 holds true also for coil 57.

The employment of heating coils having one or more flattened areas instead of round ones is a matter of choice which may be exercised in any of the embodiments of my invention.

Fig. 3 shows a second embodiment of the invented percolator which differs from the first one in that the convolutions of heating coil, generally denoted by 62, are substantially equal in diameter, except for 70, the bottom one, which has a larger diameter than the rest, and, in that the discharge portion 64 and intake extension 72 of coil 62 are permanently, rigidly and sealingly fixed to the bottom 60 of the water container, generally denoted by 58, by means 41 which indicates a continuous metallic layer deposited by suitable welding, soldering or brazing.

The contact arc A—B of coil 62 with the supporting surface 66 is shown to be somewhat less than one complete turn involving the bottom coil 70. But it is obvious that by suitable lowering convolution 68 the contact arc may be increased up to two convolutions.

Also in this embodiment the area marked by bracket E of the intake extension 72 is cooled by the atmosphere and that marked by bracket F of the outlet extension 64 is cooled by the liquid in container 58 to insure proper density differences in coil 62 and to prevent excess steam generation therein. Single headed arrows show the flow of the heating gaseous matter while double headed arrows indicate the flow of the liquid in coil 62 which has always the same direction.

The mode of operation of the second preferred embodiment is substantially the same as that of the first, hence it need not be repeated.

Figs. 4 and 5 show a third embodiment of the invented percolator which differs from the first preferred embodiment only that water container, generally denoted by 74, has bottom plate 76 provided with two downwardly protruding tubular extensions, one in the center and one close to the periphery. Each of these extensions, generally denoted by 78, has a conical smooth inner portion 80 and a cylindrical inner threaded portion 82 the minor diameter of the threads being greater than the maximum diameter of the conical portion. Each of the extensions 78 accommodates one conical plug 90 each of which being rigidly attached to and sealingly enveloping one of the end portions 106 (outlet) or 104 (inlet) of heating coil, generally denoted by 98. The end portions are attached to the plugs by means 41 representing a continuous, sealing layer of metal deposited by suitable welding, brazing or soldering.

Conical plugs 90 have tapered end portions 92 continued each into a cylindrical portion having an annular circumferential groove 96. A threaded, split bushing 84 having head 86 and turning holes 88, and an inwardly protruding collar 89 encircles rotatably each of plugs 90. The outer threaded portion of bushing 84 coacts with threaded portion 82 of extension 78 and collar 89 of bushing 84 fills groove 96 in each of the plugs 90. Coil 98 is shown to be very similar to coil 36 of the first embodiment except that the outlet extension 106 and the top of inlet extension 104 of coil 98 each being attached to a separate plug are further away spaced from each other than the respective end portions of coil 36 fixed to one common plug. Accordingly the bottom convolution is denoted by 102 and the next one by 100.

The assembly of coil 98 with water container 74 is effected by placing split bushings 84 around plugs 90 when the coil is detached from the container, so that collars 89 of bushing 84 fill the grooves 96 of the plugs. Subsequently the plugs and bushings are made to coact with extensions 78 by screwing bushings 84 into threaded portions 82 whereby conical portions 92 of plugs 90 are sealingly pressed into conical portions 80 of extension 78. Just like in the first embodiment the taper angles of plugs and extensions are selected to be such that they develop sufficient friction to prevent loosening by vibration. The heads 86 are shown to be polygonal for suitable engagement by a wrench and holes 88 serve also the purpose to be engaged by a bar to exert torque upon bushing 84. Through the groove and collar engagement of plugs and bushings by threading-in the latter into extension 78 the plug 90 is forced into sealing position and by unthreading the bushing 84 plugs 90 are pulled out for disassembling.

Also in this embodiment the bottom convolution 102 and the riser part of the intake extension 104 of coil 98 lay outside the orthogonal projection of the bottom 76 of container 74 and the bracket-marked areas (E and F) are subjected to cooling by the atmosphere and liquid content of container 74, respectively. The path of the heating gases is indicated by the single headed arrows and the direction of the flow of the liquid in coil 98 is shown by the double headed arrows.

The mode of operation of the described third embodiment of my invention is substantially the same as those of the previous ones.

I conducted protracted experiments and tests with percolators and I found that coils which are encased within an extension of a water container will not achieve the object of my invention, namely the rapid and practically free of escaping steam percolation, efficient infusion, preservation of almost the total valuable ingredients extracted from the coffee beans, the economizing of time and fuel and the avoidance of steaming-up the premises. By comparative tests with the invented and with conventional percolators I found that, while the conventional percolator of four cups capacity needed 8 minutes to start the water percolating over the coffee seeds, the invented percolator of the same capacity started the water percolating in 30 seconds. This supports the results of computation and vice versa. By enlarging the employed heating coil this speed can be further increased and additional time saved. It will be noted that in all embodiments the heating coil or tubular base has a plurality of convolutions the average distance or mean distance from the container of which are increasing considering them in succession toward the bottom convolution adjoining the inlet extension. To tubular extensions 22 (Fig. 1) and 78 (Figs. 4, 5) I refer collectively as "neck."

Having fully described my invention and shown and described preferred embodiments thereof, it will be understood that various changes and modifications may be made therein by those skilled in the art without departing from the spirit and scope of my invention, hence, I do not wish to be limited by the disclosed preferred embodiments but what I claim as new and desire to protect by Letters Patent is:

1. Rapid percolator comprising a vertically elongated container for liquid having an opening at its top, an outer cover detachably fitting said opening, a tubular base provided with convolutions adjoining at one end a relatively short inlet extension reaching into the bottom portion of said container and at the other end continuing in a longer outlet extension reaching into the top portion of said container, attachment means rigidly and sealingly fixed to said extensions of said base and also to said container it supports above said convolutions in stable equilibrium upon a substantially horizontal surface, a vessel having openings, carried by said outlet extension in said container, for holding material to be infused, said base providing communication for the liquid in said container between bottom- and top-portions thereof in either direction and said convolutions being arranged free in the atmosphere and subjected to the thermal effects of freely streaming heating gases from below said base, the major portion of at least one of said convolutions and that of said inlet extension lying substantially outside the orthogonal vertical projection of said container and subjected to the cooling effect of the atmosphere, said outlet extension being centrally located relative to said container and exposed to the unhampered cooling effect of the liquid therein, the said attachment means including at least one, from said container downwardly protruding and widening tubular neck portion, the upper part of the inner surface of which is conical, the lower part of said inner surface is threaded, a plug, fixed to one of said extensions carried inserted in said neck, said plug having part of the upper portion of its outer surface matchingly conical with said neck's conical inner surface, thread means coacting with the inner surface of said neck and with the outer surface of said plug relatively displacing them axially and in operative position pressing said conical surfaces sealingly together.

2. Rapid percolator comprising a vertically elongated container for liquid having an opening at its top, an outer cover detachably fitting said opening, a tubular base provided with convolutions adjoining at one end a relatively short inlet extension reaching into the bottom portion of said container and at the other end continuing in a longer outlet extension reaching into the top portion of said container, attachment means rigidly and sealingly fixed to said extensions of said base and also to said container it supports above said convolutions in stable equilibrium upon a substantially horizontal surface, a vessel having openings, carried by said outlet extension in said container, for holding material to be infused, said base providing communication for the liquid in said container between bottom- and top-portions thereof in either direction and said convolutions being arranged free in the atmosphere and subjected to the thermal effects of freely streaming heating gases from below said base, the major portion of at least one of said convolutions and that of said inlet extension lying substantially outside the orthogonal vertical projection of said container and subjected to the cooling effect of the atmosphere, said outlet extension being centrally located relative to said container and exposed to the unhampered cooling effect of the liquid therein, the said attachment means including at least one, from said container downwardly protruding and widening tubular neck portion, the upper part of the inner surface of which is conical, the lower part of said inner surface is cylindrical and threaded, a plug, fixed to one of said extensions and being provided outwardly with a circumferential annular groove, said plug having part of the upper portion of its outer surface matchingly conical with said neck's conical inner surface, an outwardly threaded cylindrical bushing, split into two halves axially and provided with an inwardly protruding annular collar, inserted between each of said plug and corresponding neck, the threads of said bushing engaging said inner threads of said neck and said collar of said bushing occupying said annular groove of said plug, a head portion downwardly protruding from said bushing, said head being adapted to be engaged by turning tools, said bushing coacting with said neck and plug relatively displacing them axially and in operative position pressing said conical surfaces of the neck and plug sealingly together 3. Rapid percolator comprising a vertically elongated container for liquid having an opening at its top, an outer cover detachably fitting said opening, a tubular base provided with convolutions adjoining at one end a relatively short inlet extension reaching into the bottom portion of said container and at the other end continuing in a longer outlet extension reaching into the top portion of said container, attachment means rigidly and sealingly fixed to said extensions of said base and also to said container it supports above said convolutions in stable equilibrium upon a substantially horizontal surface, a vessel having openings through its side and bottom, carried by said outlet extension in said container, for holding material to be infused, said base providing communication for the liquid between the top- and bottom-portions of said container through said convolutions in either direction, said convolutions being arranged free in the atmosphere and subjected to the thermal effects of heating gases freely streaming from below said base, the major portion of at least one of said convolutions and that of said inlet extension lying substantially outside the vertical orthogonal projection of said container and subjected to the cooling effect of the atmosphere, said outlet extension being centrally located relative to said container and exposed to the unhampered cooling effect of the liquid therein, the average distance of said convolutions from said container increasing toward said inlet extension to which the adjoining convolution has the tangent plane to its bottom coinciding with said substantially horizontal surface upon which the percolator is supported and said attachment means including at least one, from said container downwardly protruding and widening tubular neck portion, the upper part of the inner surface of which is conical, the lower part of said inner surface is cylindrical and threaded, a plug, fixed to one of said extensions and being provided outwardly with a circumferential annular groove, said plug having part of the upper portion of its outer surface matchingly conical with said neck's conical inner surface, an outwardly threaded cylindrical bushing, split into two halves axially and provided with an inwardly protruding annular collar, inserted between said plug and corresponding neck, the threads of said bushing engaging said inner threads of said neck and said collar of said bushing occupying said annular groove of said plug, a head portion downwardly protruding from said bushing and carrying holes to be engaged by pins of turning tools, said bushing coacting with said neck and plug relatively displacing them axially and in operative position pressing said conical surfaces of said neck and plug sealingly together.

4. Rapid percolator comprising a hollow, heat resisting container for liquid having an opening at its top, an outer cover detachably fitting said opening, a continuous coil having convolutions and rendering unhampered heat transfer and conduction of flow of liquid in either direction throughout its entire length, said coil protruding downwardly from said container and being adapted to support it in stable equilibrium upon a substantially horizontal flat surface, attachment means for fastening said coil watertight to said container, a vessel, having perforated bottom, sides and a perforated cover for holding material to be infused, mounted within the top portion of said container, said coil having an inlet extension communicating with the bottom part of said container directly and an outlet extension that opens in the top part of said container and rises over said perforated cover so that it discharges percolating liquid thereupon, the convolutions of said coil being arranged free and sidewardly unshielded in the atmosphere and subjected to the thermal effects of gases freely streaming from below said container, the major parts of at least one of said convolutions and that of said inlet extension of said coil lying substantially outside the orthogonal projection of said container and subjected to the cooling effect of the atmosphere, said outlet extension being exposed to the unhampered cooling effect of the liquid in said container and said attachment means including one centrally located tubular neck downwardly protruding from said container, said neck having an internal conical portion and an internal cylindrical threaded portion, a plug sealingly mounting both extensions of said coil, said plug having a conical portion and a cylindrical threaded portion fitting the respective portions of said neck and a head with means of engagement for tools to turn it, whereby threading said plug into said neck the coacting conical portions seal said coil watertight to said container.

WILLIAM W. GASKELL, Jr.

REFERENCES CITED

The following references are of record in the file of this patent:

UNITED STATES PATENTS

| Number | Name | Date |
|---|---|---|
| 51,083 | Emerick | Nov. 21, 1865 |
| 76,514 | Patterson et al. | Apr. 7, 1868 |
| 1,036,767 | Wojidkow | Aug. 27, 1912 |
| 1,452,256 | Rowley | Apr. 17, 1923 |
| 2,036,933 | Gomes | Apr. 7, 1936 |
| 2,046,710 | Umstott | July 7, 1936 |
| 2,485,247 | Wahl | Oct. 18, 1949 |

FOREIGN PATENTS

| Number | Country | Date |
|---|---|---|
| 728,542 | France | Apr. 12, 1932 |